(12) United States Patent
Huang et al.

(10) Patent No.: US 6,614,950 B2
(45) Date of Patent: Sep. 2, 2003

(54) FIBER BRAGG GRATING-BASED OPTICAL CDMA ENCODER/DECODER

(75) Inventors: Jen-Fa Huang, Tainan (TW); Yu-Lung Lo, Tainan (TW); Dar-Zu Hsu, Tainan (TW); Chang-Yuan Hsieh, Tainan (TW)

(73) Assignee: National Science Council, Taipei (TW)

( * ) Notice: Subject to any disclaimer, the term of this patent is extended or adjusted under 35 U.S.C. 154(b) by 230 days.

(21) Appl. No.: 09/848,899

(22) Filed: May 4, 2001

(65) Prior Publication Data

US 2002/0163696 A1 Nov. 7, 2002

(30) Foreign Application Priority Data

Jun. 23, 2000 (CN) .......................................... 89112629 A

(51) Int. Cl.[7] .............................. G02B 6/26; H04J 14/08

(52) U.S. Cl. ..................... 385/15; 359/124; 359/130; 359/136; 359/137; 359/173

(58) Field of Search ............................. 385/14, 15, 37, 385/24; 359/124, 127, 130, 136, 137, 173, 188

(56) References Cited

U.S. PATENT DOCUMENTS

2001/0055138 A1 * 12/2001 Richardson et al. ........ 359/173
2002/0063928 A1 * 5/2002 Hansen et al. .............. 359/130
2002/0150334 A1 * 10/2002 Richardson et al. .......... 385/37

OTHER PUBLICATIONS

K. O. Hill, et al; *Fiber Bragg Grating Technology fundamentals and Overview*; Journal of Lightwave Technology, vol. 15. No. 8, Aug. 1997; (pp. 1263–125).

J.A. Salehi, et al; *Coherent Ultrashort Light Pulse Code–Division Multiple Access Communication Systems*; Journal of Lightwave Technology, vol. 8, No. 3, Mar. 1990; (pp. 478–491).

Fan R.K. Chung, et al; *Optical Orthogonal Codes: Design, Analysis, and Applications*; IEEE Transactions on Information Theory, vol. 35, No. 3, May 1989; (pp. 595–604).

*Primary Examiner*—Hemang Sanghavi
(74) *Attorney, Agent, or Firm*—Birch, Stewart, Kolasch & Birch, LLP

(57) ABSTRACT

An optical spectral coding scheme for fiber-optic code-division multiple-access (FO-CDMA) networks. The spectral coding is based on the pseudo-orthogonality of FO-CDMA codes properly written in the fiber Bragg grating (FBG) devices. For an incoming broadband optical signal, the designed Bragg wavelengths of the FBG will be reflected and spectrally coded with the written FO-CDMA address codes. Maximal-length sequence codes (M-sequence codes) are chosen as the signature or address codes to exemplify the coding and correlation processes in the FO-CDMA system. By assigning the N cyclic shifts of an M-sequence code vector to N users, the invention achieves an FO-CDMA network that can support N simultaneous users. The FO-CDMA encoding/decoding devices consist of a series of FBGs. To overcome the impact of multiple-access interference (MAI) on the performance of the FO-CDMA system, the FBG decoder is configured on the basis of orthogonal correlation functions of the nearly orthogonal M-sequence codes.

11 Claims, 10 Drawing Sheets

OTHER PUBLICATIONS

L.R. Chen, et al; *Applications of Ultrashort Pulse Propagation in Bragg Gratings for Wavelength–Division Multiplexing and Code–Division Multiple Access*; IEEE Journal of Quantium electronics, vol. 34, No. 11, Nov. 1998; (pp. 2117–2129).

M. Kavehrad, et al; *Optical Code–Division–Multiplexed Systems Based on Spectral Encoding of Noncoherent Sources*; Journal of Lightwave Technology, vol. 13, No. 3, Mar. 1995; (pp. 534–545).

R.A. Griffin, et al; *Coherence Coding for Photonic Code–Division Multiple Acess Networks*; Journal of Lightwave Technology, vol. 13, No. 9, Sep. 1995; (pp. 1826–1837).

A. Grunnet–Jepsen, et al; *Spectral Phase Encoding and Decoding Using Fiber Bragg Gratings*; Templex Technology; (undaated); (pp. PD33–1–PD33–3).

X. Wang, et al; *Novel Temporal/Spectral Coding technique Based on Fiber Brqgg Gratings for Fiber Optic CDMA Application*; (undated); (pp. WM50–1/341–343).

R. Papannareddy, et al; *Performance Comparison of Coherent Ultrashort Light Pulse and Incoherent Broad–Band CDMA Systems*; IEEE Photonics Technology Letters, vol. 11, No. 12, Dec. 1999; (pp. 1683–1685).

\* cited by examiner

FIBER BRAGG GRATING-BASED OPTICAL CDMA ENCODER/DECODER

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

This invention relates to an optical spectral coding scheme for a high-performance optical code-division multiple-access (OCDMA) network system. The encoder and decoder are structured with cascaded fiber Bragg grating (FBG) devices. The scheme can eliminate the multiple-access interference (MAI), and can promote the CDMA system capacity. Using the simple coder structure and low cost devices, the invention can be used on switching routers to connect local network computers, or on exchange modules for signal switching between network nodes. It is applicable to Asymmetric Digital Subscriber Loop (ADSL), or Cable Modem to connect with digital home network, local area network (LAN), and Internet etc.

BACKGROUND OF THE INVENTION

Optical networking is one way to provide a range of telecommunications services to meet the growing demands of an information-based society. However, existing multiple access implementations for LAN (local-area network) or MAN (metropolitan-area network) networks are apparently inadequate. Optical code-division multiple-access (OCDMA) offers versatile connection between numerous local network users, along with generous control on the wavelength stability or network synchronization requirements. Hence OCDMA techniques have drawn much attention in recent years.

Fiber Bragg gratings (FBG) are produced by exposure of photosensitive fiber to ultraviolet light. They have a refractive index that is spatially periodic along the propagation axis of a fiber. The desirable filtering characteristics of fiber Bragg gratings are disclosed by K. O. Hill and G. Meltz (*IEEE J. Lightwave Technology*, vol. 15 (8), pp. 1263–1276, 1997) and have been employed in some optical devices. For example, the Distributed Bragg Reflector (DBR) is designed with Bragg gratings in the laser resonant cavity. The DBR accumulates energy in the resonant cavity and emits light when the accumulated energy reaches a threshold. Fiber gratings have also been used for performing optical measurements. For example, due to the Bragg wavelength's change with tension or temperature, fiber Bragg gratings can measure the variation of external factors. In addition, the gratings can be used for the gain compensation of an Erbium-Doped Fiber Amplifier (EDFA), for the analyses improvement of spectral analyzer, and so on.

In optical fiber communications, fiber Bragg gratings can be employed as chromatic compensators. The propagation of long-wavelengths is slower than the propagation of short-wavelengths, causing the phenomenon of pulse broadening (or "dispersion") in fiber transmission. This pulse broadening tends to reduce the data bit rate of digital communication. Fiber Bragg gratings provide "chirped apodization" by reflecting long-wavelength components at the front end of the grating and short-wavelength components at the rear end of the grating. This compensates for chromatic dispersion by ensuring that the full light band spends the same amount of time to pass through chromatic dispersion and grating compensation. Another popular application of FBG is the realization of light wave filter with the desired wavelengths on the reflective end. Such characteristics of fiber Bragg gratings are utilized in this invention to construct a new scheme of optical CDMA encoder/decoder devices.

J. A. Salehi et al. disclosed the technology of code-division multiple-access (CDMA) [*IEEE J. Lightwave Technology*, vol. 8 (3), pp. 478–491, 1990] for the application of optical fiber communications. In the early periods, bipolar codes with good correlation properties, such as M-sequence or Gold code, were adopted for the optical CDMA communications. At the transmitter end, data bits are encoded into unipolar optical signals. The receiver makes an Electrical/Optical (E/O) conversion and has a bipolar address decoding procedure in the electrical domain. Since after E/O conversions, the receiver must go through the procedure of Sequence Inverse Keying (SIK), the system is named as the SIK-CDMA. The SIK-CDMA system needs multiple electrical/optical and optical/electrical conversions and hence has serious limitation on the data transmission rate. Thereafter, research efforts have aimed at the all-optical signal processing to promote the data transmission rate.

In the light wave domain, the optical signal is inherently a unipolar system. As stated by F. R. K. Chung et al. [*IEEE Trans. on Inform. Theory*, vol. 35 (3), pp. 595–604, 1989], unipolar signature code such as optical orthogonal code (OOC) and modified prime code (MPC) can have the same correlation characteristics as those of the traditional bipolar sequences. Since the cross-correlation of unipolar codes is incapable of achieving complete orthogonality, the number of "1" in code sequences must be restricted to improve the correlation characteristic. Unfortunately, this means that a given code sequence length should have relatively few "1". The number of unipolar code sequences is therefore far less than that of the traditional bipolar sequence codes.

One of the early demonstrations of OCDMA uses optical delay lines and optical orthogonal codes for OCDMA time domain coding. The time-encoded optical CDMA coder is as presented in FIG. 4. In this delay line configuration of FIG. 4, the incoming signal is split into several independent paths in which each signal is delayed according to the specific delay elements of the desired optical orthogonal codes. The tapped delay line scheme suffers from high splitting loss due to intensity splitting among the optical delay lines. Also, to comply with the hasty growth on the number of users, one needs to substantially lengthen the code sequence to promote the system capacity. This increases system expenditures and is unsuited for the economical benefit.

On retracing the past technology, there were cases on utilizing the concept of optical phase coding to implement code-division multiplexing. These technologies need coherent, ultrashort pulses, with transmitter and receiver being wavelength and phase coherent. L. R. Chen et al. investigated ultrashort pulse propagation in fiber Bragg gratings [*IEEE Journal of Quantum Electronics*, vol. 34 (11), pp. 2117–2129, 1998] with applications on Wavelength Division Multiplexing (WDM) and Code-Division Multiple-Access (CDMA) systems. The adopted incident optical source is broadband ultrashort pulse. The coding scheme is the table-lookup type of frequency hopping. The decoder grating was arranged in a reverse order to that of the encoder grating to accomplish the same optical path for every component spectral chip.

A well-known frequency encoder for optical broadband sources is disclosed in the article by M. Kavehrad and D. Zaccarin [*IEEE J. Lightwave Technology,* vol. 13 (3), pp. 534–545, 1995], and is shown in FIG. 5. This is the typical representative of incoherent broadband CDMA systems. The optical frequency coder of FIG. 5 consists of a pair of diffraction gratings placed at the focal planes of a unit magnification confocal lens pair. The first grating spatially decomposes the spectral components present in the incoming optical signal with a certain resolution. A spatially patterned mask is inserted midway between the lenses at the point where the optical spectral components experience maximal spatial separation. After the mask, the spectral components are re-assembled by the second lens and second grating into a single optical beam. The mask can modify the frequency components in phase and/or in amplitude, depending on the coherence property of the incident optical source. The apparatus has been used with high-efficiency for temporal shaping of short pulses. An example has been illustrated by R. A. Griffin et al. [*IEEE J. Lightwave Technology,* vol. 13 (9), pp. 1826–1837, 1995] in an optical coherence coding scheme to implement optical frequency hopping CDMA. This article is the typical representative of coherent ultrashort pulse CDMA systems.

Japan Pat. No. JP9312619A issued to Thomas Pfeiffer in 1997 brings up another frequency-coding scheme of optical CDMA transmission system. By virtue of a Fabry-Perot-like periodic optical filter, the LED or Er-ASE source spectrum is divided into several narrow optical pulses, and then processed with Electrical/Optical (E/O) data modulation. At the receiver, an optical coupler makes Optical/Electrical (O/E) conversions on the received accumulated optical pulses. The signals are then distributed to different bandpass filters by a branching device. Each receiver has a local oscillator to produce the necessary signals for data demodulation. The electrical signal finally passes through the low-pass filter to retrieve the desired data information. The encoding mechanisms in this patent periodically sliced the optical source and then proceeded with the optical modulation to achieve the coding effect.

A. Grunnet-Jepsen et al. incorporated phase shifts and wavelength chirps among the grating segments and demonstrated coherent spectral phase coding of pulses for use in CDMA systems [OFC/IOOC'99 conference proceeding, pp. PD33/1–PD33/3, 1999]. X. Wang et al. used prime codes over FBGs to demonstrate experimentally a novel hybrid temporal/spectral coding technique for fiber optic CDMA application [OFC/IOOC'99 conference proceeding, pp. PD34/1–PD34/3, 1999]. Both authors adopted ultrashort pulses with coherent spectral coding scheme for simultaneous optical pulses operation on the time and frequency domains.

R. Papannareddy and A. M. Weiner [*IEEE Photonics Technology Letters,* vol. 11 (12), pp. 1683–1685, 1999] evaluated performance comparisons between coherent ultrashort pulse and incoherent broadband CDMA systems. Though ultrashort pulse CDMA can in principle yield a substantial throughput advantage over the incoherent broadband systems, incoherent threshold energy detection is believed to be a more reliable approach than coherent grating pulse alignment. Moreover, the scheme of coherent OCDMA needs femto-second ultrashort pulse technology. This is still a great challenge at the present time.

SUMMARY OF THE INVENTION

This invention discloses a "Fiber Bragg Grating-based Optical CDMA Encoder/Decoder" scheme. It utilizes the fine filtering function of fiber Bragg gratings to produce reflected and transmitted narrowband spectral chips with specifically designed wavelengths. The invention combines the precise filtering characteristics of optical fiber grating and the pseudo-orthogonal correlations of maximal-length sequence codes (M-sequence codes) to structure encoder/decoder modules for a fiber-optic CDMA system.

The technology of optical CDMA allows multiple users in local area networks (LAN's) to access the same fiber channel asynchronously with no delay or scheduling. Multiple users within the same channel can simultaneously deliver data messages and share the same wideband resources. The technique of fiber-optic CDMA is a very good selection for developing optical fiber as a broadband transmission medium. Code-division multiple-access system possesses anti-interference characteristics and can solve the bursty traffic problem. It enhances the system capacity and has good secrecy. Hence it is proving desirable for wireless and fiber-optic communications.

To solve the deficiency that only unipolar sequence can be used on the conventional optical CDMA system, this invention aims at using fiber Bragg gratings to generate specific wavelength spectral chips. With the pre-written M-sequence codes in the fiber gratings, the invention devises a simple scheme for the fiber-optic CDMA encoder/decoder. With such a scheme, traditional M-sequence codes can be suitably applied for the optical fiber communications. The scheme can solve the deficiency that unipolar sequence has to be largely lengthened to promote the number of system users. More importantly, on utilizing the quasi-orthogonal correlations of M-sequence codes, the invention can eliminate the multiple-access interference (MAI) caused by other users in the system. This greatly enhances the system performance and reduces the transmission error probability.

On judging system performance under the same bandwidth and bit error probability, coherent ultrashort pulse CDMA can in principle yield substantial throughput advantage over the incoherent broadband CDMA. However, coherent CDMA needs femto-second ultrashort pulse technology. This is still a great challenge at the present time. This invention may be used in non-coherent optical CDMA systems. The invention combines the on-off keying modulation of broadband LED or Er-ASE sources and the pseudo-orthogonal characteristic of M-sequence codes written in the fiber gratings. The scheme can eliminate multiple-access interference (MAI) encountered in optical CDMA systems. Unlike traditional OCDMA systems, the present invention avoids the use of diffraction gratings, confocal lenses, and/or optical phase masks. Instead, the invention devises properly coded fiber grating devices to simplify system complexity The reliability of fiber Bragg gratings is also dependable.

BRIEF DESCRIPTION OF THE DRAWINGS

FIG. 6(a) encoder gratings 102
FIG. 6(b) decoder gratings 302
FIG. 6(c) grating spectrum response
FIGS. 7(a)–(c) illustrated Er-ASE spectrum schema on encoder gratings 102
FIG. 7(a) source spectra before and after equalization
FIG. 7(b) spectrum response of grating
FIG. 7(c) reflected spectral chips
FIGS. 8(a)–(c) Coder structures and spectrum responses of encoder gratings 112 and decoder gratings 312
FIG. 8(a) encoder gratings 112
FIG. 8(b) decoder gratings 312
FIG. 8(c) grating spectrum response
FIGS. 9(a)–(c) illustrated LED spectrum schema on encoder gratings 112
FIG. 9(a) source spectra before and after equalization
FIG. 9(b) spectrum response of grating
FIG. 9(c) reflected spectral chips
FIGS. 10(a)–(c) spectrum schema of summed signal on decoder gratings 302
FIG. 10(a) received summed spectral chips
FIG. 10(b) reflected chips
FIG. 10(c) transmitted chips
FIGS. 11(a)–(c) spectrum schema of summed signal on decoder gratings 312
FIG. 11(a) received summed spectral chips
FIG. 11(b) reflected chips
FIG. 11(c) transmitted chips

REFERENCE NUMBER OF THE ATTACHED DRAWINGS

Figure 1:
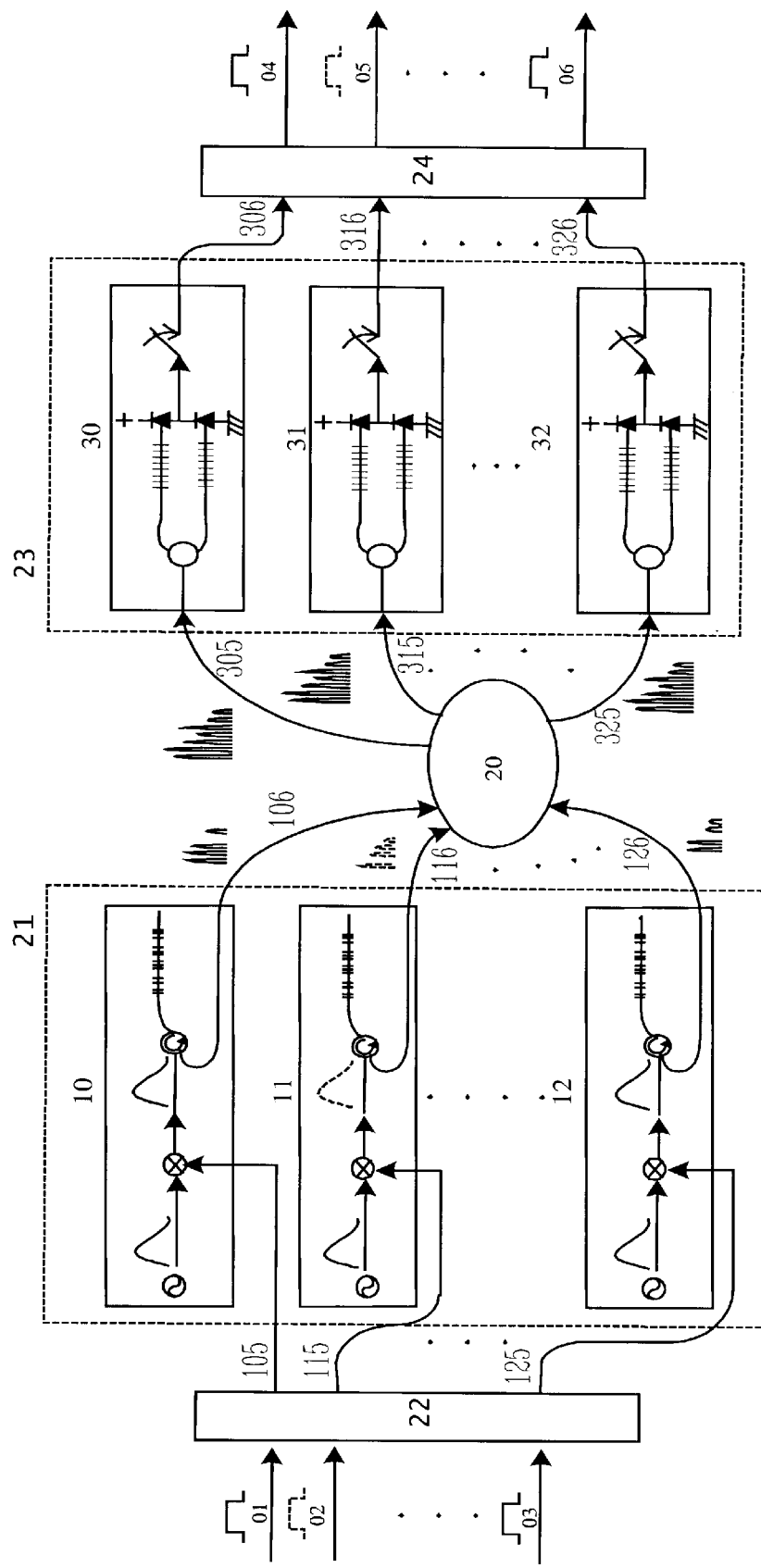
FIG. 1 illustrated system architecture of fiber-optic CDMA system.

01~03 to be delivered message at the transmitter end
04~06 decoded message at the receiver end
10~12 optical encoder modules at the transmitter end
101 optical circulator in encoder module 10
102 multiple encoder gratings in the encoder module 10
112 multiple encoder gratings in the encoder module 10
103 external optical intensity modulator
104 Er-ASE optical source in the encoder module 10
114 LED optical source in the encoder module 11
105 input data stream for optical encoder module 10
106 encoded spectral signal from encoder module 10
115 input data stream for optical encoder module 11
116 encoded spectral signal from encoder module 11
20 K×K optical star coupler
21 K sets of transmitter encoder modules
22 input buffer module
23 K sets of receiver decoder modules
24 output buffer module
30~32 optical decoder modules at the receiver end
301 optical circulator in decoder module 30
302 multiple decoder gratings in the decoder module 30
312 multiple decoder gratings in the decoder module 31
303 balanced photo-detector unit within decoder module 30
313 balanced photo-detector unit within decoder module 31
304 information data decision unit
305 received summed spectral chips to decoder module 30
306 decoded information data bits from decoder module 30
315 received summed spectral chips to decoder module 31
316 decoded information data bits from decoder module 31
40 Er-ASE optical spectrum before equalization
41 spectrum response of fiber encoder grating 102
42 Er-ASE optical spectrum after equalization
421 reflected spectral chip at wavelength $\lambda_1$
422 reflected spectral chip at wavelength $\lambda_2$
423 reflected spectral chip at wavelength $\lambda_3$
424 reflected spectral chip at wavelength $\lambda_6$
50 LED optical spectrum before equalization
51 spectrum response of fiber encoder grating 112
52 LED optical spectrum after equalization
521 reflected spectral chip at wavelength $\lambda_2$
522 reflected spectral chip at wavelength $\lambda_3$
523 reflected spectral chip at wavelength $\lambda_4$
524 reflected spectral chip at wavelength $\lambda_7$
60 received summed spectral chips from star coupler 20
61 reflected spectral chips through fiber grating 302
62 transmitted spectral chips through fiber grating 302
611 reflected spectral chip at wavelength $\lambda_1$
612 reflected spectral chip at wavelength $\lambda_2$
613 reflected spectral chip at wavelength $\lambda_3$
614 reflected spectral chip at wavelength $\lambda_6$
621 transmitted spectral chip at wavelength $\lambda_4$
622 transmitted spectral chip at wavelength $\lambda_5$
623 transmitted spectral chip at wavelength $\lambda_7$
70 received summed spectral chips from star coupler 20
71 reflected spectral chips through fiber grating 312
72 transmitted spectral chips through fiber grating 312
711 reflected spectral chip at wavelength $\lambda_2$
712 reflected spectral chip at wavelength $\mu_3$
713 reflected spectral chip at wavelength $\lambda_4$
714 reflected spectral chip at wavelength $\lambda_7$
721 transmitted spectral chip at wavelength $\lambda_1$
722 transmitted spectral chip at wavelength $\lambda_5$
723 transmitted spectral chip at wavelength $\lambda_6$

DETAILED DESCRIPTION OF THE INVENTION

The invention of "fiber Bragg grating-based optical CDMA (code-division multiple-access) encoder/decoder" consists of paired K transmitters and K receivers that are connected in a star configuration to share the same optical fiber medium. Each encoder and decoder is linked with a K×K star coupler. Each bit of information from the corresponding user is ON-OFF shift keying the broadband incoherent optical carrier to fulfill the E/O modulation. The modulated optical field corresponding to each data bit is directed to a fiber Bragg grating for the spectral encoding operation. The spectrum-encoded lightwaves of each transmitter are put together with an optical star coupler and broadcast to all receivers in the network. At the receiver end, through the matched signature or address codes, the transmitted signal sequence is reversed with successful de-correlation process on the receiver decoder.

Optical code-division multiple-access (OCDMA) can elastically connect with K network users, and can have generous control on the wavelength stability or the requirement of network synchronism. Hence OCDMA techniques have drawn much attention on multiple-access applications in local-area network (LAN) or metropolitan-area network (MAN). This invention devises a fiber-grating-based encoder and decoder scheme with applications on OCDMA network system. The proposed OCDMA spectral coding devices consist of a series of fiber Bragg gratings. The spectral pattern of fiber Bragg gratings will correspond to the chips distribution of maximal-length sequence codes (M-sequence codes) used for the optical encoding and decoding of information data bits. The invention can eliminate multiple-access interference (MAI) caused by other system users at the receiver. In this way, it can enhance signal transmission quality and promote the number of simultaneous users.

The invention aims at the spectral coding of incoherent lightwave signals on the pseudo-orthogonal coded fiber Bragg gratings. By the phrase "spectrally pseudo-orthogonal coded fiber Bragg gratings", we mean a series of FBGs having the generated spectral chips patterns corresponding to that of the nearly orthogonal CDMA codes. FIG. 1 illustrates the proposed fiber-optic code-division multiple-access scheme. The system is structured with a group set 21 of K transmitter encoder modules, a group set 23 of K receiver decoder modules, and a K×K optical star coupler 20 used to link with encoders 21 and decoders 23. At the transmitter end, delivered messages 01~03 pass through input buffer module 22 to adjust the timing alignment of the optical encoders 21. At the receiver end, decoded messages 04~06 pass through output buffer module 24 to adjust the timing alignment of the optical decoders 23.

Figure 2:
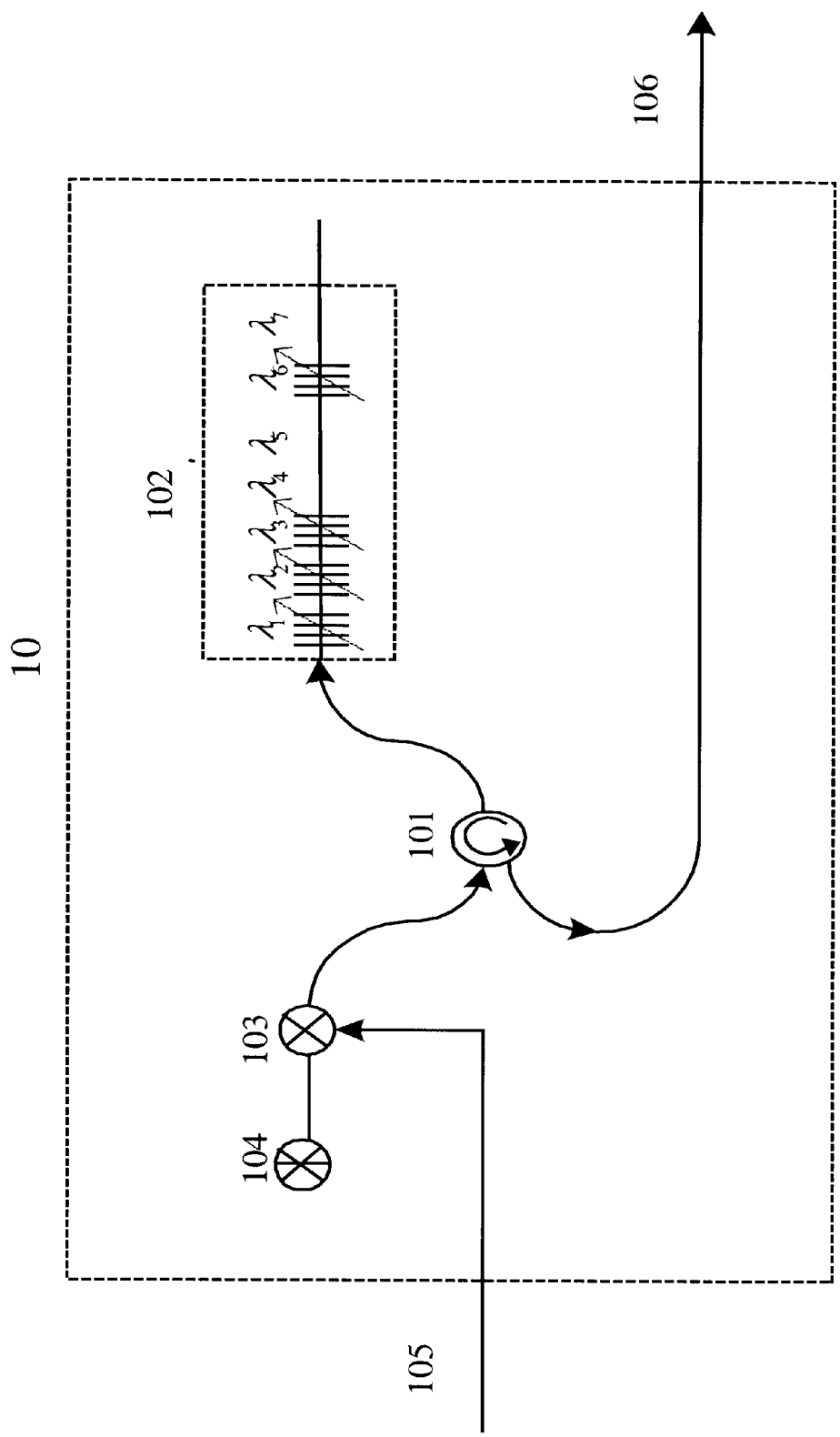
FIG. 2 illustrated encoder scheme of fiber-optic CDMA system, (Encoder module 10 taken as example)
Figure 3:
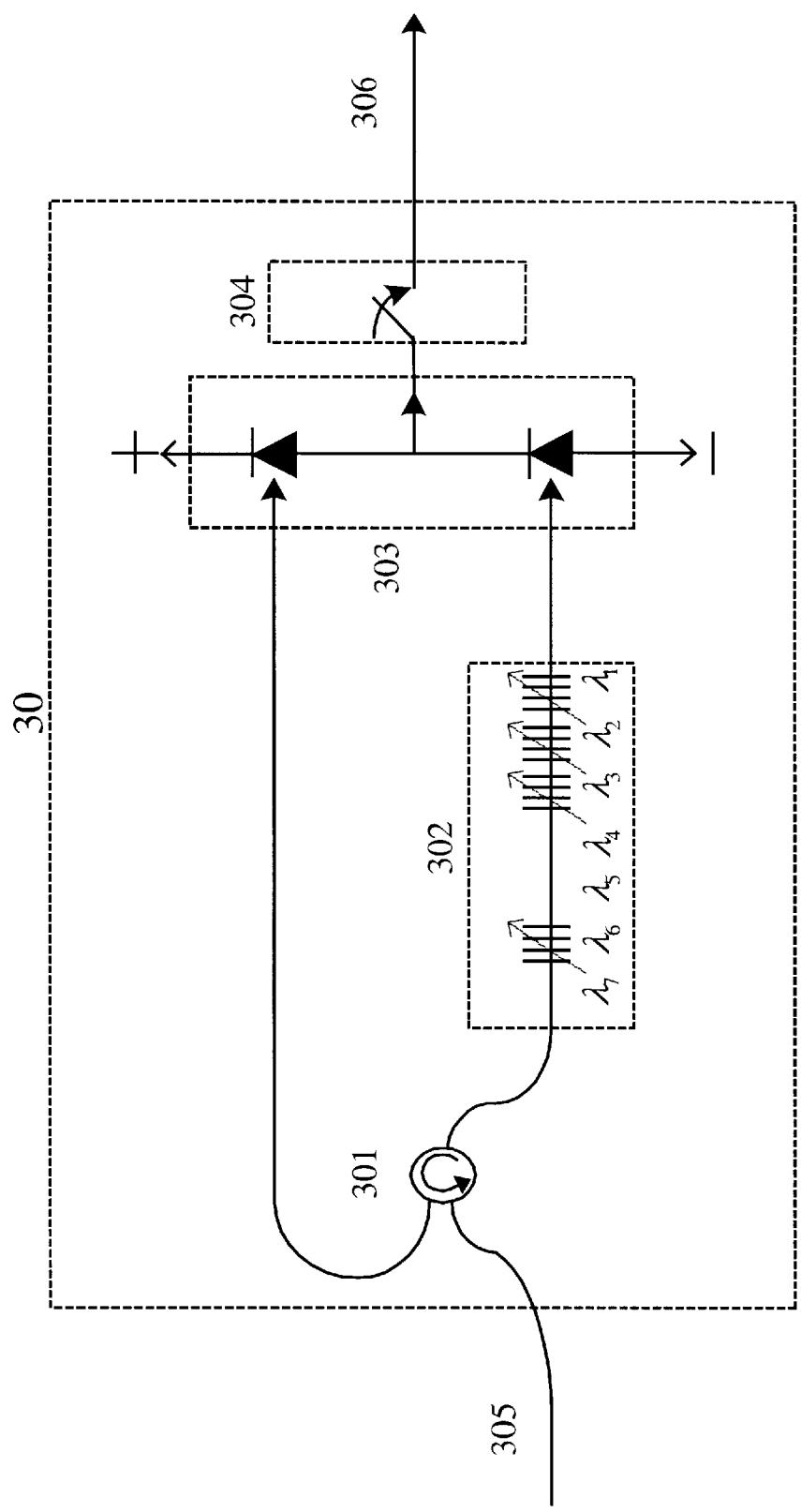
FIG. 3 illustrated decoder scheme of fiber-optic CDMA system, (Decoder module 30 taken as example)
Figure 4:
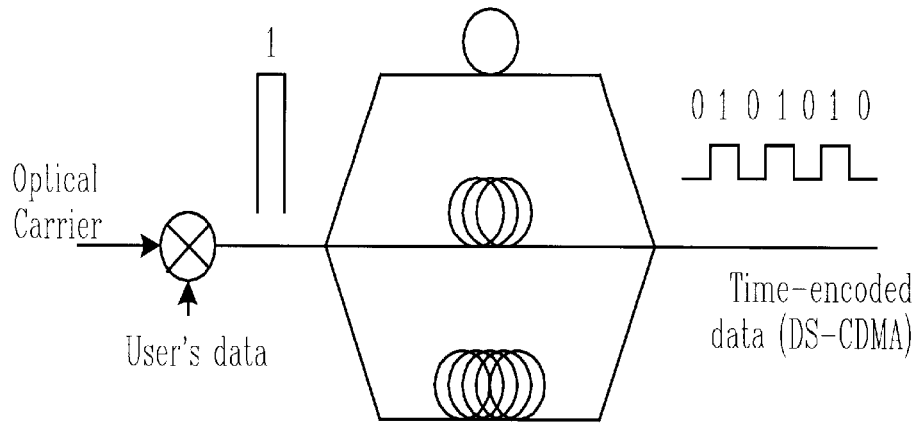
FIG. 4 Optical coherence coding with tapped delay line known in the prior art.
Figure 5:
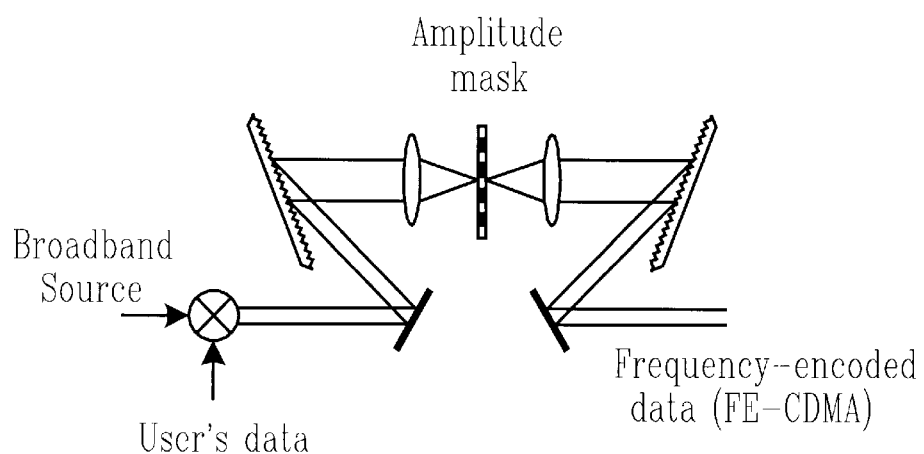
FIG. 5 Optical frequency coding with diffraction gratings, confocal lenses, and phase mask known in the prior art.

Optical transmitter encoders 21 comprises a set of K encoder modules 10~12. FIG. 2 illustrates the internal structure of the encoder module 10. The encoder module 10 comprises an optical circulator 101, a set of multiple fiber gratings 102, an external intensity modulator 103, and an incoherent broadband optical source 104. Optical receiver decoders 23 comprises a set of K decoder modules 30~32. FIG. 3 illustrates the internal structure of the decoder module 30. The decoder module 30 comprises an optical circulator 301, a set of multiple fiber gratings 302, a balanced photo-detector unit 303, and an information data decision unit 304. This invention exemplifies the OCDMA system with K pairs of simultaneous users. Each pair of users is assigned with the same set of optical CDMA signature code. The encoder and decoder modules are linked with a K×K star coupler. The network users access the same fiber channel and share the same wideband resources.

The input buffer module 22 and output buffer module 24 illustrated in FIG. 1 are mainly used for timing alignment of users data bits in the Electrical/Optical (E/O) and Optical/Electrical (O/E) processes. These input and output buffer modules make easier the synchronization handling among the asynchronous information data users. The proposed optical fiber code-division multiple-access scheme can be applied both to point-to-point communication and point-to-multipoint networks in which the receiver can tune on a particular incoming signal by adjusting its address code to match the corresponding transmitter. By use of piezoelectric transducer (PZT) devices, the Bragg wavelength of each fiber-grating decoder may be adjusted independently, effectively changing the signature spectral pattern and therefore allowing for programmable address codes.

FIG. 2 illustrates the internal structure of optical transmitter encoder module 10. The module comprises an optical circulator 101, a set of multiple fiber gratings 102, an external intensity modulator 103, and an incoherent broadband optical source 104. Suitable incoherent optical sources for such encoder module include those of Edge-emitting LED's (ELED), Superluminescent Diodes (SLD) and Erbium-Amplified Spontaneous Emissions (Er-ASE). These sources offer broadband spectrum, high emitting power, low temperature sensitivity, and small drive current requirement. Particularly, the incoherent broadband sources are characterized by their low costs due to high yields in packaging technology.

In the illustrated optical encoder module 10 shown in FIG. 2, information data bit 105 from the corresponding user is On-Off Keying (OOK) the incoherent broadband carrier 104 in the external intensity modulator 103 to fulfill the Electrical/Optical modulation. In other words, optical energy will be transmitted for information bit "1" and an absence of optical energy will signify information bit "0". The modulated optical field corresponding to each data bit is directed through optical circulator 101 to fiber encoder gratings 102 for spectral encoding. The reflected spectral chips from fiber encoder gratings 102 are passed through optical circulator 101 to become optical output signal 106. As depicted in FIG. 1, the optical output signal 106 is directed to star coupler 20 to couple with other reflected output signals from optical encoder modules 11, 12. These spectrum-encoded lightwave signals are summed or accumulated in the optical star coupler 20 and broadcast to all the receivers in the network.

FIG. 3 illustrates the internal structure of optical receiver decoder module 30. The module comprises an optical circulator 301, a set of multiple fiber gratings 302, a balanced photo-detector unit 303 composed with two identical photodiodes, and an information decision unit 304. For data messages to be transmitted to the intended receiver, the optical encoder grating 102 imposes a CDMA signature on information data bits. This signature sequence, or generally called address code, must match to that of the optical decoder grating 302 at the receiver end. The task of the receiver is to extract the desired user's bit stream from the received signal that consists of the desired data stream and the undesired multiple-access interference (MAI). The capacity of optical CDMA network is dependent on the ability of the decoder to cancel the multiple-access interference. Such multiple-access interference is increased with the number of users in the system.

In the illustrated optical decoder module 30 shown in FIG. 3, the accumulated optical spectral chips 305 pass through optical circulator 301 and feed into decoder Bragg grating 302 to proceed spectrum decoding. The spectral signals reflected from fiber decoder gratings 302 are output through optical circulator 301. The reflected optical signal from decoder gratings 302 is complement to the optical signal transmitted through decoder gratings. These complementary spectral signals are incident on the two photodiodes in the balanced photo-detector unit 303 for optical-to-electrical photo-detection. The net energy of photo-detected electrical current is read on the information decision unit 304. Within one data bit, if the net energy of photo-detected electrical current is high enough, the user data bit is decided as logical "1". On the contrary, if the net energy of photo-detected electrical current is nearly zero, the user data bit is decided as logical "0". The decoded output data bits 306 will finally depart the receiver decoder module 30 after passing through the output buffer module 24, as depicted in FIG. 1.

The core element in the proposed fiber-optic CDMA encoder/decoder scheme is fiber Bragg grating (FBG)

devices. Fiber Bragg gratings are produced by exposure of photosensitive fiber to ultraviolet light. They have a refractive index that is spatially periodic along the propagation axis of a fiber. The spectral chip wavelength is dependent on the grating pitch and the refractive index variation of the FBGs. The spectral frequency pattern of fiber encoder/decoder gratings, with spectral chips centered about the Bragg wavelengths, is determined by the OCDMA codes properly written in the fiber gratings. Maximal-length sequence codes (or simply M-sequence codes) are used in this invention to exemplify the coding and correlation processes among OCDMA network users. For M-sequence of code length N, the N cycle shifts of any M-sequence codeword can be assigned to N users to get an OCDMA network that can support N simultaneous users.

The fiber grating is simply an optical diffraction device where the incoming wavelength matching the Bragg condition will be diffracted in the opposite direction. This means that for an incoming broadband optical signal having spectral component equal to the designed Bragg wavelength of the fiber grating, the spectral chip component will be reflected, or it will be transmitted. The gratings will spectrally and temporally slice an incoming broadband spectrum to N component spectral chips with centered wavelengths $(\lambda_1, \lambda_2, \ldots, \lambda_N)$. Each grating is designed to possess a given centered wavelength $\lambda_n$, $1 \leq n \leq N$, that is different from others and is distributed over the bandwidth of the chips. On employing a piezoelectric transducer (PZT) device, the central wavelengths of FBGs can be adjusted independently, effectively changing the signature spectral pattern and therefore allowing for programmable address codes.

Since the optical spectra of incoherent Light-Emitting Diodes (LED) or Erbium-Amplified Spontaneous Emissions (Er-ASE) sources are not uniform, the reflected spectral chips from fiber Bragg gratings will have different amplitudes. These different amplitudes of the chips will affect the orthogonality of the code family. Theoretically, the chips can be designed to be of different spectral widths to have equal optical chips power. In reality, it is not easy to achieve diverse grating widths to balance the flatness of optical source spectrum. It is impossible to achieve diverse grating widths in the mass production of fiber gratings. As a compromised way, the incoherent source can be suitably equalized, and the spectral amplitude is equally sliced in the more flattened central region of the equalized spectra. With such scheme of spectral equalization, every spectral chip can have almost the same pulse energy. This strategy will facilitate the receiver decoder design in view of signal energy detection.

With a properly written fiber-optic CDMA coding pattern, the reflected light field from fiber Bragg grating will be spectrally encoded onto an address code denoted by the code vector $$X_k = (x_{k,0}, x_{k,1}, \ldots, x_{k,N-1})$$

or $$X_k(\lambda) = \sum_{n=0}^{N-1} x_{k,n} p_n(\lambda - n\Lambda_c)$$

Here, N is the periodic length of the fiber-optic CDMA address code (or the number of chips per bit). $x_{k,n} \in \{0, 1\}$, for $0 \leq n \leq N-1$, is the n-th chip value of the k-th user's spectral code. $\Lambda_c$ and $p_n(\lambda)$ are the chip width and the fundamental pulse of each chip in the spectral domain. The invention assumes a Gaussian distribution for each fundamental chip pulse. Nearly the same pulse energy for each spectral chip is also assumed.

A set of K×K passive star coupler 20 is used to connect the local network users in the system. Each transmitter broadcasts its spectrum-encoded signal to all the receivers in the network. The received signal spectrum is a sum of all the active users' transmitted optical signal spectra on star coupler 20:

$$S(\lambda) = \sum_{k=1}^{N} b_k X_k(\lambda - l_k)$$

where $b_k \in \{0, 1\}$, for $k=1, 2, \ldots, N$, are the k-th user's information data bits, and $l_k$, $0 \leq l_k \leq \Lambda_c$, is the k-th user's arbitrary shift in spectral domain.

The receiver applies a correlating decoder to the incoming signal to extract the desired bit stream. For simplicity, the invention assumes the k-th user's arbitrary spectral shift to be $l_k=0$, then the correlating decoder output of the k-th user is $$\hat{X}_k = \int_0^{T_b} X_k(\lambda) S(\lambda) d\lambda$$

$$= b_k \int_0^{T_b} [X_k(\lambda)]^2 d\lambda + \sum_{\substack{j=1 \\ j \neq k}}^{N} b_j \int_0^{T_b} X_k(\lambda) X_j(\lambda) d\lambda$$

$$= b_k N + MAI.$$

The first term is the desired data stream of the k-th user, and the second term is the multiple-access interference coming from the other users. In order to reduce the influence of the MAI, the pseudo-orthogonal multiple-access code sequence with low cross-correlation is necessary.

Pseudo-orthogonal codes with good correlation properties (i.e., high auto-correlation peaks with low sidelobes, and low cross-correlation functions) are needed to reduce the undesired interference from other simultaneous network users. Such multiple-access interference (MA) is the primary factor that limits the performance of the fiber-optic CDMA system. To reduce the undesirable effects caused by MAI, orthogonal (or nearly orthogonal) codes with acceptable levels of crosstalk between network users are required. A distinguished FBG decoder scheme is configured on the basis of the correlation functions of the nearly orthogonal M-sequence codes. By etching M-sequence codes into the fiber gratings, the spectral encoding and correlation decoding of fiber-optic CDMA system can be implemented. With proper encoder/decoder design, an intended receiver user that computes a well-defined correlation term will reject any interfering user and obtain quasi- or pseudo-orthogonality among users in the OCDMA system.

In the proposed fiber-optic CDMA system, each transmitter encoder is assigned with an M-sequence signature code for optical spectral encoding. The corresponding receiver decoder is assigned with the same M-sequence address code for correlation decoding. Maximal-length sequence code is a class of nearly orthogonal binary codes. The shift-and-add property of M-sequences means that the modulo-2 sum of an M-sequence and any cycle phase shift of the same M-sequence is another phase of the same sequence. M-sequence code of length $N=2^n-1$ contains $(N+1)/2=2^{n-1}$ '1's and $(N-1)/2=2^{n-1}-1$ '0's. That is, in each period of the sequence the number of '1's differs from the number of '0's by one at the most. This is the well-known pseudo-random characteristic of maximal-length sequence codes.

Denote $X=(x_0, x_1, \ldots, x_{N-1})$ and $Y=(y_0, y_1, \ldots, y_{N-1})$ to be two M-sequence code vectors of length N. The periodic correlation between X and Y is defined as $$R_{XY}(k) = \sum_{i=0}^{N-1} (x_i y_{i+k}).$$

Note that only periodic correlation function is considered here; operations of partial correlation or aperiodic correlation are not under consideration. Let $\overline{X}=(\overline{x}_0, \overline{x}_1, \ldots, \overline{x}_{N-1})$ be the complement code vector of X with chip elements obtained by $\overline{x}_i = 1 - x_i$. The periodic correlation between $\overline{X}$ and Y then is $$R_{\overline{X}Y}(k) = \sum_{i=0}^{N-1} (\overline{x}_i y_{i+k})$$

Our purpose is to construct a proper FBG encoder/decoder scheme that will compute $R_{XY}(k) = R_{\overline{X}}Y(k)$ in the fiber-optic CDMA network.

In the proposed fiber-optic CDMA system, M-sequence code vectors $Y=T^k X$ can be assigned to different network users, where $T^k$ is an operator that shifts M-sequence code vector $X=(x_0, x_1, \ldots, x_{N-2}, x_{N-1})$ cyclically to the right by k bits, $0 \leq k \leq N-1$. For example, $TX=(x_{N-1}, x_0, x_1, \ldots, x_{N-3}, x_{N-2})$, $T^2 X=(x_{N-2}, x_{N-1}, x_0, \ldots, x_{N-4}, x_{N-3})$, and $T^3 X = (x_{N-3}, x_{N-2}, x_{N-1}, x_0, \ldots, x_{N-4})$, and so on.

Then, the periodic correlation between codes X and Y is $$R_{XY}(k) = \sum_{i=0}^{N-1} (x_i x_{i+k}).$$

Note that the sum $i+k$ in the subscript of $x_{i+k}$ is taken modulo N.

According to the shift-and-add property of maximal-length sequence codes, the invention can obtain the periodic correlation functions $R_{XY}(k)=(N+1)/2$, for k=0;

$R_{XY}(k)=(N+1)/4$, for k=1 to N-1.

In the proposed fiber-optic CDMA system, the receiver that computes correlation difference $R_{XY}(k) - R_{\overline{X}}Y(k)$ will result in $$R_{XY}(k) - R_{\overline{X}Y}(k) = \left[\sum_{i=0}^{N-1} x_i x_{i+k}\right] - \left[\sum_{i=0}^{N-1} (1-x_i) x_{i+k}\right]$$

$$= 2R_{XY}(k) - R_{XY}(0)$$

$$= 2(N+1)/4 - (N+1)/2 \ (for \ k \neq 0)$$

$$= 0.$$

With respect to the above equation, the receiver decoder in the fiber-optic CDMA network can be suitably designed by using the precise filtering properties of the Fiber Bragg Gratings. Since maximal-length sequence codes can achieve $R_{XY}(k) - R_{\overline{X}}Y(k) = 0$ at the receiver end assigned with signature X, the invention can construct two decoder branches based on code vectors X and $\overline{X}$ to decode the received code vector Y. The receiver user X that computes the correlation subtraction $R_{XY}(k) - R_{\overline{X}}Y(k)$ will get a null value. That is, an intended receiver user X with decoder design based on the calculation of $R_{XY}(k) - R_{\overline{X}}Y(k)$ will reject the signal coming from the interfering user having sequence $Y = T^k X$, $k \neq 0$. By assigning the N cycle shifts of an M-sequence codeword to N users, the invention structures a network that can theoretically support N simultaneous users without multiple-access interference. The invention has therefore obtained quasi-orthogonality between the fiber-optic CDMA network users.

The reflected chips pattern from FBG encoder/decoder is determined by the signature address codes assigned to the transmitter/receiver users. In order to reduce the effect of multiple-access interference in the fiber-optic CDMA network, M-sequence codes with low cross-correlation values are chosen as the signature address codes. An example is illustrated in Table I for N=7 chips M-sequences address codes assigned to the transmitter and receiver users.

TABLE I

| | assigned signature sequence | data bit | transmitted optical signal |
|---|---|---|---|
| user#1 | 1 1 1 0 0 1 0 | 1 | 1 1 1 0 0 1 0 |
| user#2 | 0 1 1 1 0 0 1 | 0 | 0 0 0 0 0 0 0 |
| user#3 | 1 0 1 1 1 0 0 | 1 | 1 0 1 1 1 0 0 |
| user#4 | 0 1 0 1 1 1 0 | 1 | 0 1 0 1 1 1 0 |
| user#5 | 0 0 1 0 1 1 1 | 0 | 0 0 0 0 0 0 0 |
| user#6 | 1 0 0 1 0 1 1 | 0 | 0 0 0 0 0 0 0 |
| user#7 | 1 1 0 0 1 0 1 | 1 | 1 1 0 0 1 0 1 |
| summed spectral chips (S) | | | 3 3 2 2 3 2 1 |

Referring to Table I, user #1 is assigned the signature code $X_1=(1, 1, 1, 0, 0, 1, 0)$. User #2 is assigned the signature code $X_2=(0, 1, 1, 1, 0, 0, 1)$, which is one cyclic shift of the sequence $X_1$. For user #3, the assigned signature code is $X_3=(1, 0, 1, 1, 1, 0, 0)$, which is two cyclic shifts of the sequence $X_1$. In this way, every user will be assigned a unique N=7 chips M-sequence address code.

Among the assigned signature address codes in Table I, the '1's represent the spectral chips reflected from the corresponding gratings, and the '0's represent an absence of reflected spectral chips from the FBG coder. The possible central wavelengths of the fiber Bragg gratings are designated as the code vectors $(\lambda_1, \lambda_2, \lambda_3, \lambda_4, \lambda_5, \lambda_6, \lambda_7)$. The FBG coder for user #1 is assigned the signature $X_1=(1, 1, 1, 0, 0, 1, 0)$. The corresponding fiber gratings are placed with central wavelengths of $\lambda_1, \lambda_2, \lambda_3$, and $\lambda_6$, while no grating wavelengths of $\lambda_4, \lambda_5$, and $\lambda_7$ are placed. Similarly, the FBG coder for user #2 is assigned with the signature $X_2=(0, 1, 1, 1, 0, 0, 1)$. The corresponding fiber gratings are placed with central wavelengths of $\lambda_2, \lambda_3, \lambda_4$ and $\lambda_7$, and no grating wavelengths of $\lambda_1, \lambda_5$, and $\lambda_6$ are placed. For user #3, with the assigned signature $X_3=(1, 0, 1, 1, 1, 0, 0)$, the fiber gratings are placed with central wavelengths of $\lambda_1, \lambda_3, \lambda_4$ and $\lambda_5$ and no grating wavelengths of $\lambda_2, \lambda_4$ and $\lambda_7$ are placed. Other users can be similarly placed their fiber grating wavelengths according to their assigned signature sequences.

Figure 6:
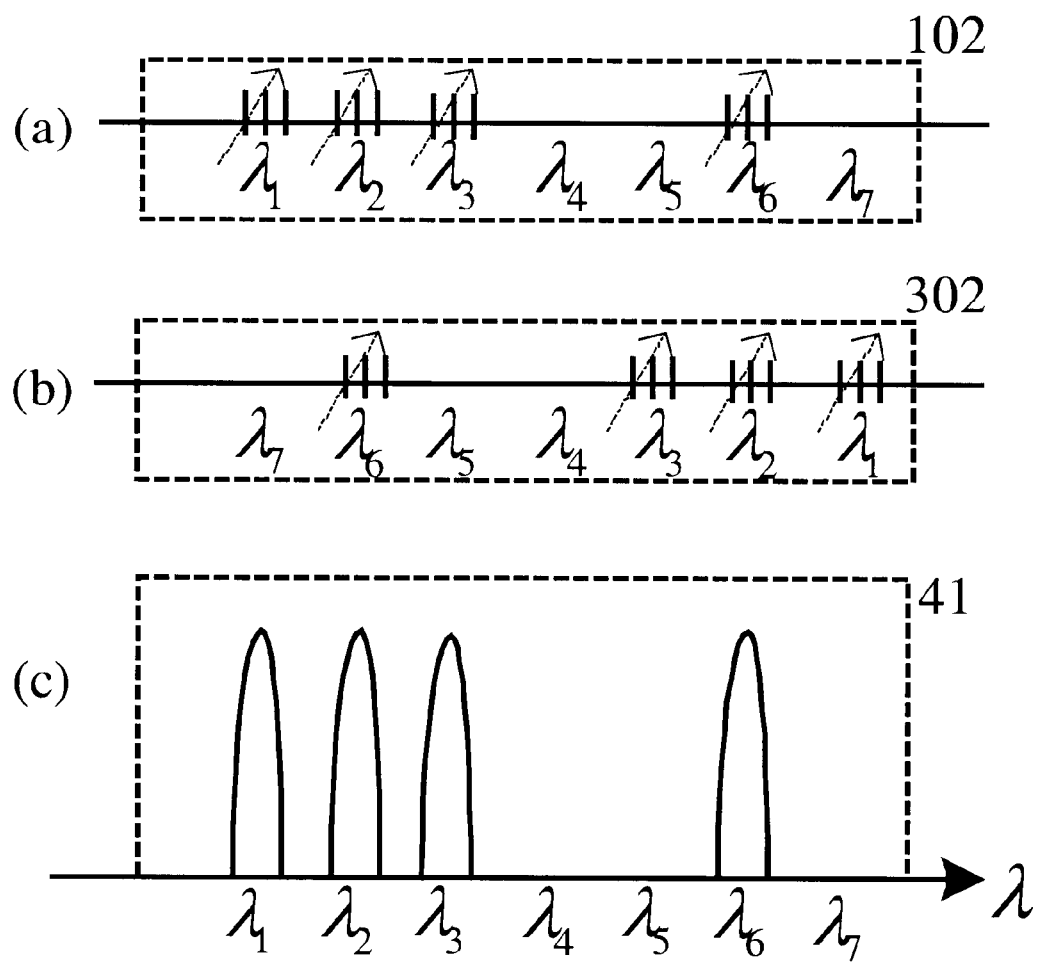
FIGS. 6(a)–(c) Coder structures and spectrum responses of encoder gratings 102 and decoder gratings 302

FIGS. 6(a)–(c) illustrate coder structures and spectrum responses of transmitter encoder gratings 102 and receiver decoder gratings 302. The spectrum responses are designed to correspond to the signature code $X_1=(1, 1, 1, 0, 0, 1, 0)$ assigned for user #1. The encoder/decoder gratings are cascaded FBGs, each is of different central wavelength. The multiple decoder gratings 302 (FIG. 6(b)) are arranged to an inverse grating order with respect to the multiple encoder gratings 102 (FIG. 6(a)) to accomplish the same optical path for every component spectral chip. The encoder gratings 102 and decoder gratings 302 characterize the same spectrum response 41 (FIG. 6(c)).

Figure 7:
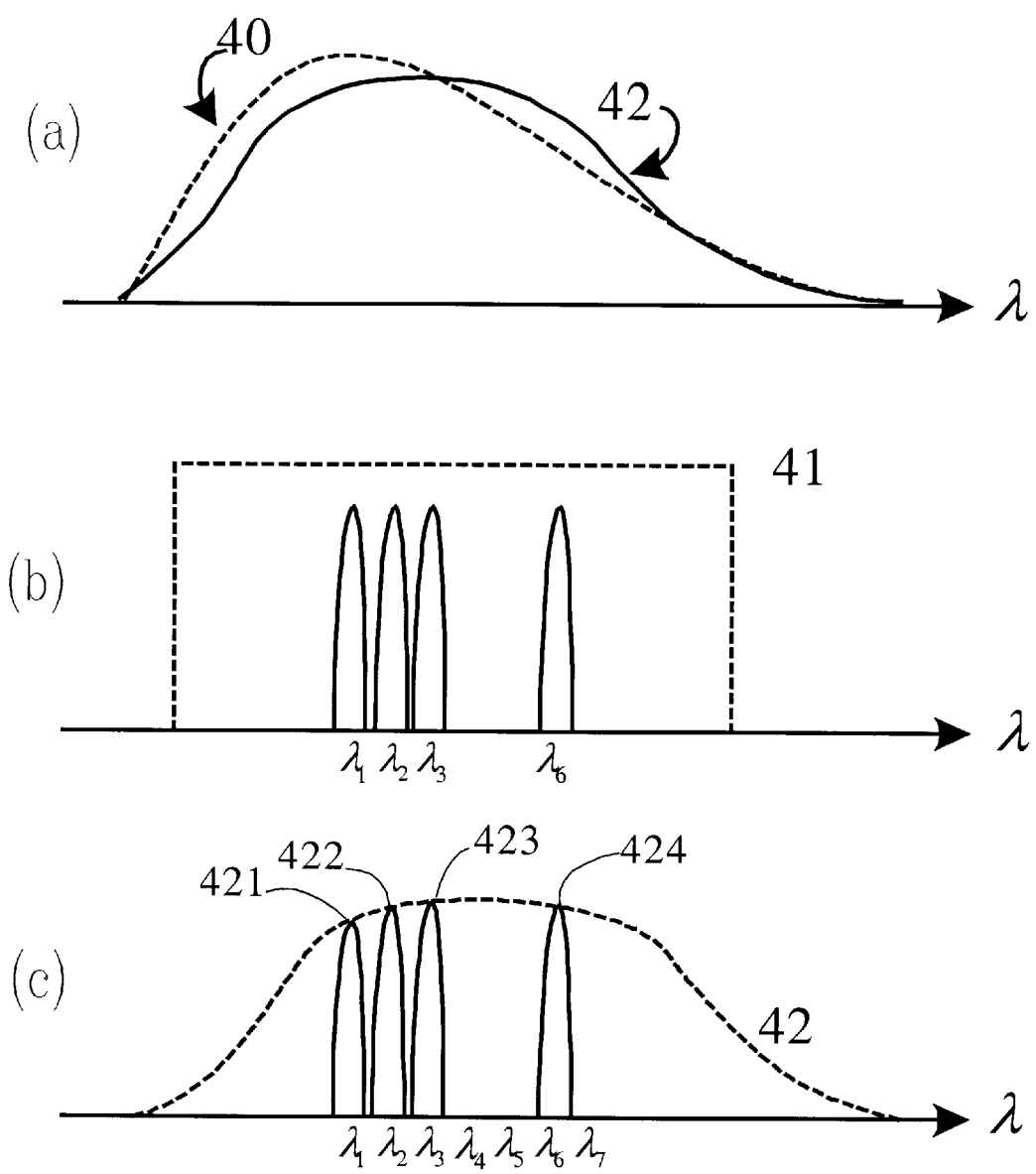

FIGS. 7(a)–(c) illustrate the spectrum schema of Er-ASE optical source signal 104 when it is incident upon fiber encoder gratings 102. FIG. 7(a) contrasts the Er-ASE source spectrum 40 before equalization with the Er-ASE source spectrum 42 after equalization. For the fiber encoder gratings 102 with spectrum response 41 (FIG. 7(b)), a suitably equalized Er-ASE source signal 42 can be sliced into several spectral chips (FIG. 7(c)). Each spectral chip has its individual central wavelength. For example, the reflected spectral chip 421 at wavelength $\lambda_1$, the spectral chip 422 at wavelength $\lambda_2$, the spectral chip 423 at wavelength $\lambda_3$, and the spectral chip 424 at wavelength $\lambda_4$. These spectral chips are designed to be of different central wavelengths, but with nearly the same pulse energy. On view of signal energy detection, this is convenient for OCDMA receiver to make its data bits decoding.

Figure 8:
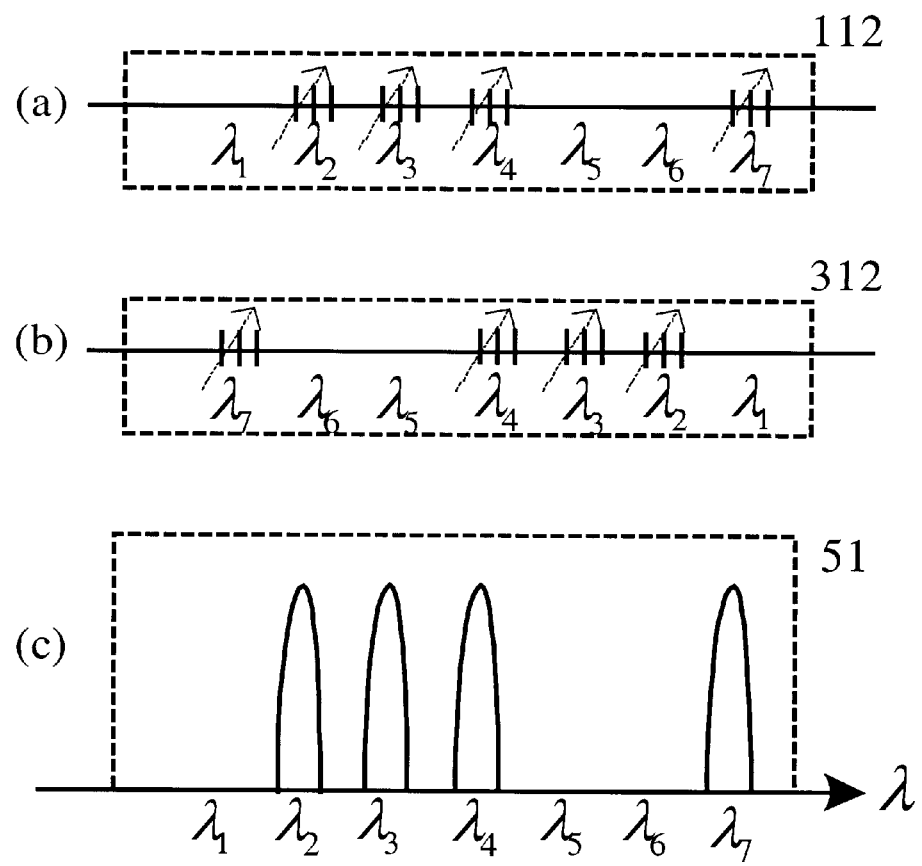

FIGS. 8(a)–(c) illustrate coder structures and spectrum responses of transmitter encoder gratings 112 and receiver decoder gratings 312. The spectrum responses are designed to correspond to the signature code $X_2=(0, 1, 1, 1, 0, 0, 1)$ assigned for user #2. The encoder/decoder gratings are cascaded FBGs, each is of different central wavelength. The multiple decoder gratings 312 FIG. 8(b) are arranged to an inverse grating order with respect to the multiple encoder gratings 112 (FIG. 8(a)) to accomplish the same optical path for every component spectral chip. The encoder gratings 112 and decoder gratings 312 characterize the same spectrum response 51 (FIG. 8(c)).

Figure 9:
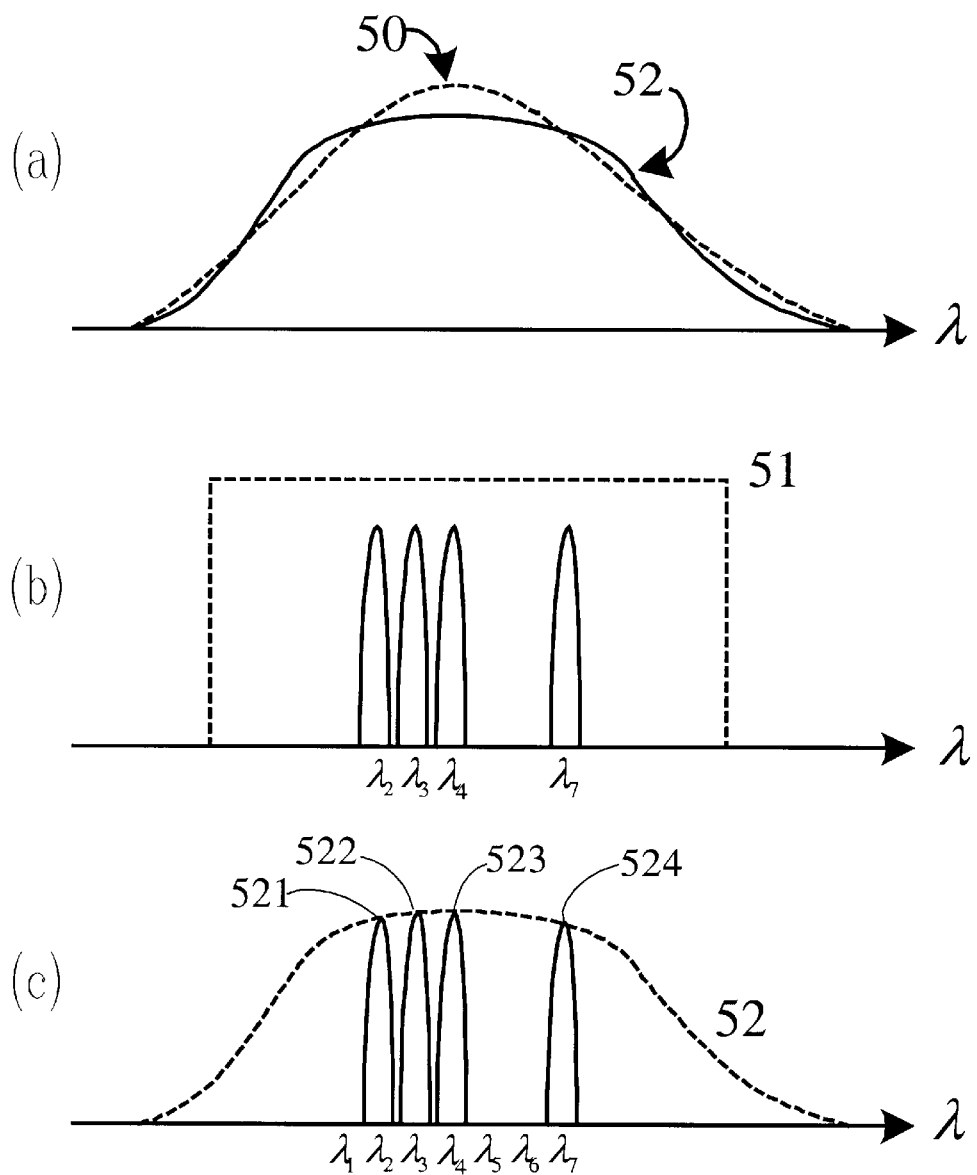

FIGS. 9(a)–(c) illustrate the spectrum schema of LED optical source signal 114 when it is incident upon fiber encoder gratings 112. FIG. 9(a) contrasts the LED source spectrum 50 before equalization with the LED source spectrum 52 after equalization. For the fiber encoder gratings 112 with spectrum response 51 (FIG. 9(b)), a suitably equalized LED source signal 52 can be sliced into several spectral chips (FIG. 9(c)). Each spectral chip has its individual central wavelength. For example, the reflected spectral chip 521 at wavelength $\lambda_2$, the spectral chip 522 at wavelength $\lambda_3$, the spectral chip 523 at wavelength $\lambda_4$, and the spectral chip 524 at wavelength $\lambda_7$. These spectral chips are designed to be of different central wavelengths, but with nearly the same pulse energy.

As illustrated in Table I, user #2, user #5 and user #6 are supposed to transmit logical "0" information data bits, while the other users transmit logical "1" information data bits. These information data bits will synchronously on-off shift keying the incoherent LED or Er-ASE source. The modulated broadband optical signals then feed into fiber encoder gratings to proceed spectral domain encoding. The fiber gratings encoder is introduced to control and modify the amplitude and/or phase spectra of the broadband incoherent optical signals. For logical "0" data bits, the encoded optical signal will be the all-zero spectral chips; for logical "1" information bits, the encoded lightwave will be the corresponding signature spectral chips. After fiber gratings encoder, the coded spectral chips are combined in a 7×7 star coupler and broadcast to each receiver in the network. Each receiver will receive the resultant code vector S=(3, 3, 2, 2, 3, 2, 1), which is obtained by adding together each transmitted chip sequence from every active user.

In the receiver, the address code assigned to the decoder will multiply the incoming received signal to accomplish the correlation decoding process. In order to spectrally decode the k-th user's information data, the received code vector S is taken to multiply the decoder signature function $X_k$ for correlation operation. The received accumulated spectral chips are passed through the FBG decoder and split into reflected and transmitted optical output fields. The correlation $SX_k$ is simply the reflected light field of the FBG decoder. Since transmitted and reflected light fields are complement to each other in the fiber grating devices, the complement correlation $S\overline{X}_k$ is the transmitted light field of the FBG decoder. By using a pair of balanced photodiodes, the subtraction of $SX_k-S\overline{X}_k$ can be implemented and then, through with information data decision unit, the desired data bits stream can be obtained.

Figure 10:
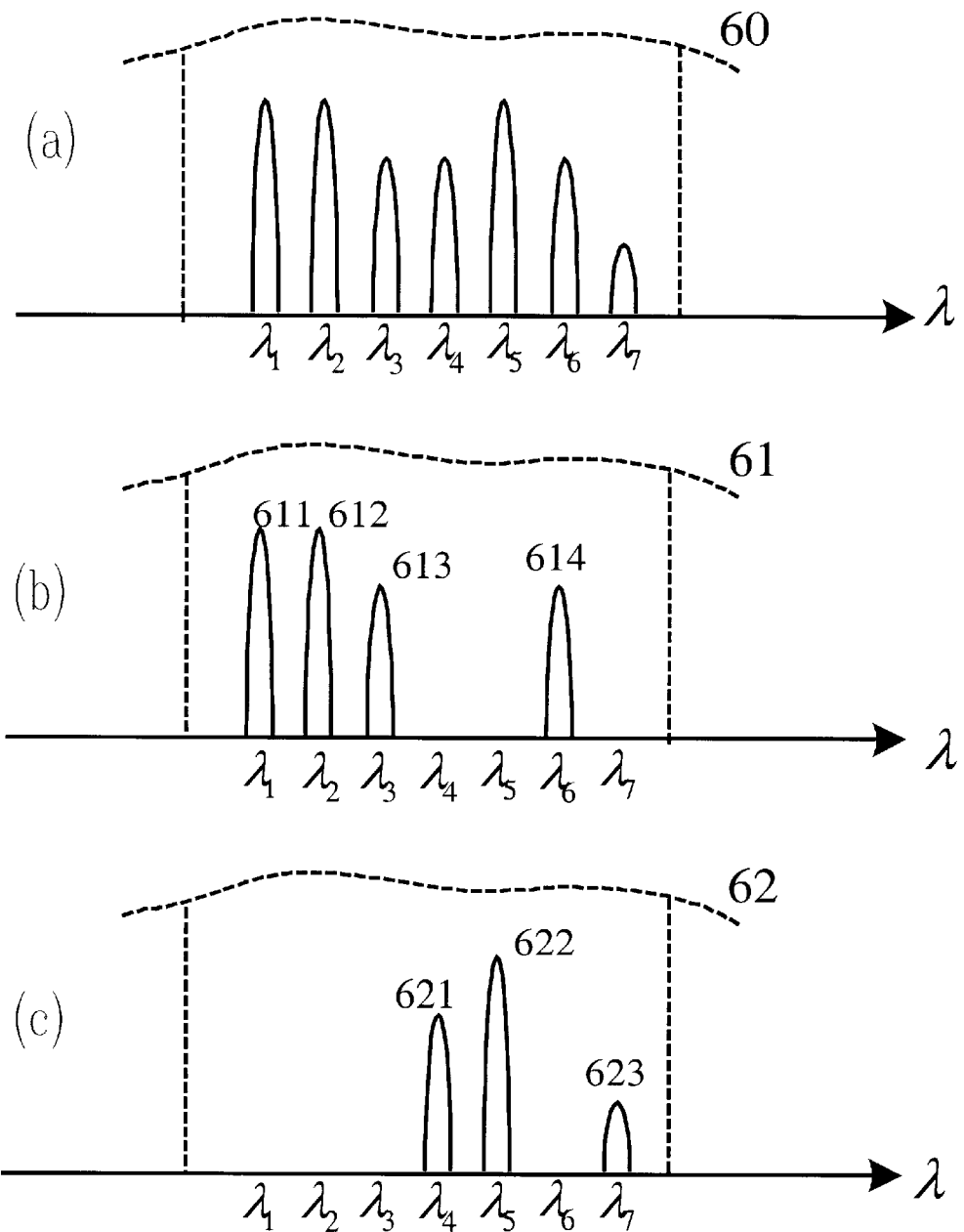

Table II, shown below, together with FIGS. 10(a)–(c) illustrate the correlation decoding processes for user #1.

TABLE II

| received(S) | 3 3 2 2 3 2 1 | |
|---|---|---|
| sequence($X_1$) | 1 1 1 0 0 1 0 | |
| reflected chips | 3 3 2 0 0 2 0 | 10 unit power |
| transmitted chips | 0 0 0 2 3 0 1 | 6 unit power |

The FBG decoder for user #1 is assigned with the signature address code $X_1=(1, 1, 1, 0, 0, 1, 0)$. The spectrum response 41 of the fiber decoder gratings 302 is as that shown in FIG. 6(c). When the received summed spectral chips 60 (FIG. 10(a)) pass through Bragg decoder gratings 302, the signal is split into reflected and transmitted optical fields that are complement to each other. In the reflected output field 61 shown in FIG. 10(b), there are reflected spectral chip 611 at wavelength $\lambda_1$, the spectral chip 612 at wavelength $\lambda_2$, the spectral chip 613 at wavelength $\lambda_3$, and the spectral chip 614 at wavelength $\lambda_4$. In the transmitted output field 62 shown in FIG. 10(c), there are transmitted spectral chip 621 at wavelength $\lambda_4$, the spectral chip 622 at wavelength $\lambda_5$, and the spectral chip 623 at wavelength $\lambda_7$. The dotted curves in FIGS. 10(a)–(c) refer to the possibly received maximal level of optical signal energy within a data bit.

As illustrated in Table II, the summed spectra S=(3, 3, 2, 2, 3, 2, 1) passed through the FBG decoder of address code $X_1=(1, 1, 1, 0, 0, 1, 0)$ are split into reflected and transmitted spectral chips. The reflected and the transmitted chip vectors are respectively $SX_1=(3, 3, 2, 0, 0, 2, 0)$ and $S\overline{X}=(0, 0, 0, 2, 3, 0, 1)$. The reflected chip sequence is added to be $R_{SX_1}=|SX_1|=10$ units power and the transmitted chip sequence is added to be $R_{S\overline{X}_1}=|S\overline{X}_1|=6$ units power. With balanced photodetectors 303 within decoder module 30, the subtraction of these spectrum power will result in $R_{SX_1}-R_{S\overline{X}_1}=4$ units of photocurrent, corresponding to a detected logical data bit of "1".

Figure 11:
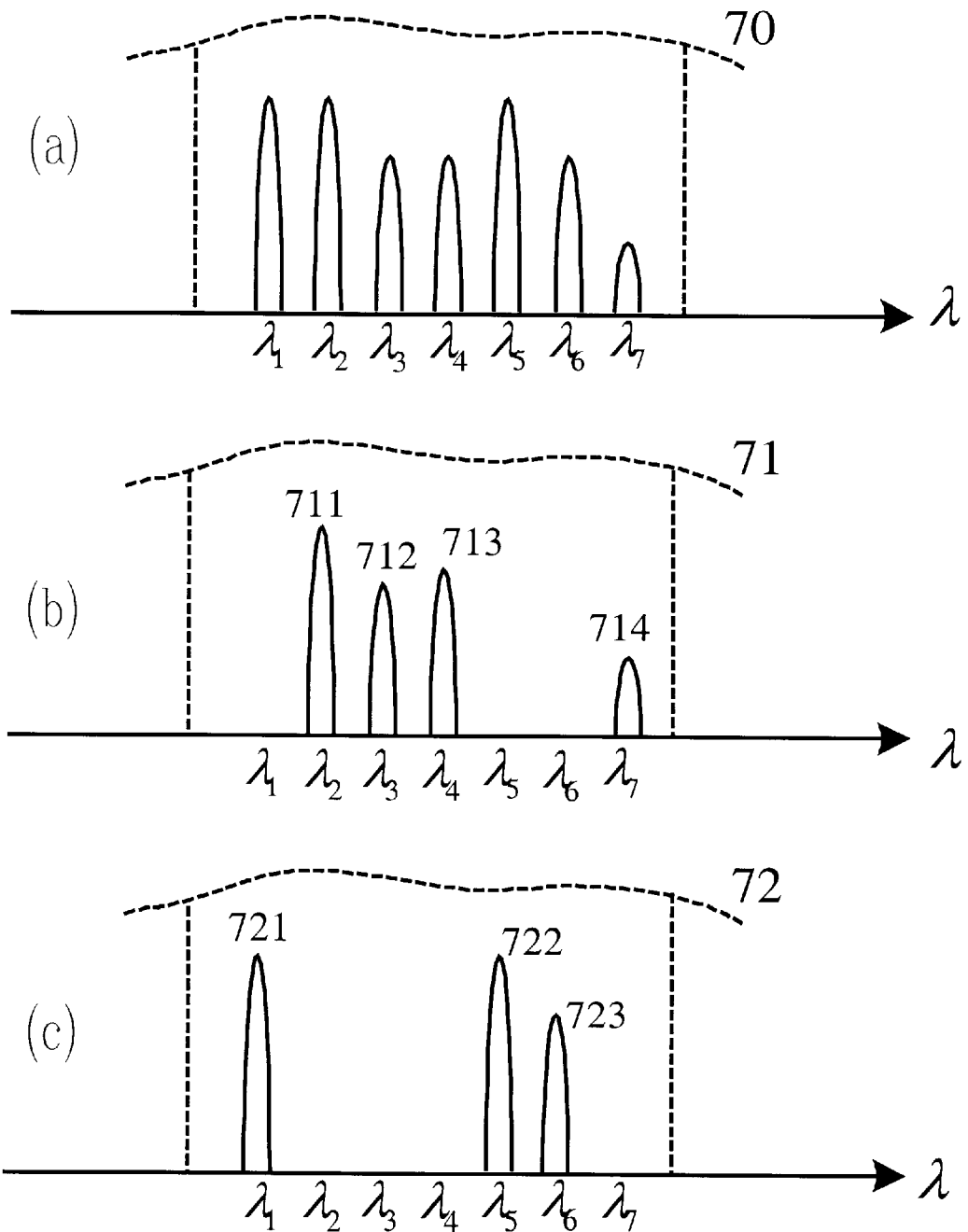

Table III, shown below, together with FIGS. 11(a)–(c) illustrate the correlation decoding processes for user #2.

TABLE III

| received(S) | 3 3 2 2 3 2 1 | |
|---|---|---|
| sequence($X_2$) | 0 1 1 1 0 0 1 | |
| reflected chips | 0 3 2 2 0 0 1 | 8 unit power |
| transmitted chips | 3 0 0 0 3 2 0 | 8 unit power |

The FBG decoder for user #2 is assigned with the signature address code $X_2=(0, 1, 1, 1, 0, 0, 1)$. The spectrum response 51 of the fiber decoder gratings 312 is as that shown in FIG. 8(c). When the received summed spectral chips 70 (FIG. 11(a)) pass through Bragg decoder gratings 312, the signal is split into reflected and transmitted optical fields that are complement to each other. In the reflected output field 71 shown in FIG. 11(b), there are reflected spectral chip 711 at wavelength $\lambda_2$, the spectral chip 712 at wavelength $\lambda_3$, the spectral chip 713 at wavelength $\lambda_4$, and the spectral chip 714 at wavelength $\lambda_7$. In the transmitted output field 72 shown in FIG. 11(c), there are transmitted spectral chip 721 at wavelength $\lambda_1$, the spectral chip 722 at wavelength $\lambda_5$, and the spectral chip 723 at wavelength $\lambda_6$. The dotted curves in FIGS. 11(a)–(c) refer to the possibly received maximal level of optical signal energy within a data bit.

As illustrated in Table III, the summed spectra S=(3, 3, 2, 2, 3, 2, 1) passed through the FBG decoder of address code $X_2$=(0, 1, 1, 1, 0, 0, 1) are split into reflected and transmitted spectral chips. The reflected and the transmitted chip vectors are respectively $SX_2$=(0, 3, 2, 2, 0, 0, 1) and $S\overline{X}_2$=(3, 0, 0, 0, 3, 2, 0). The reflected chip sequence is added to be $R_{SX_2}$=|$SX_2$|=8 units power and the transmitted chip sequence is added to be $R_{S\overline{X}_2}$=|$S\overline{X}_2$|=8 units power. With balanced photo-detectors 313 within decoder module 31, the subtraction of these spectrum power will result in $R_{SX_2}$−$R_{S\overline{X}_2}$=0 units of photocurrent, corresponding to a detected logical data bit of "0".

With the depicted fiber Bragg grating-based encoder/decoder scheme, the invention assures every optical CDMA user to successfully receive information data bits delivered from transmitter end. The invention is capable of eliminating multiple-access interference caused by other system users. Some practical limitations on the proposed fiber-optic CDMA applications can be roughly discussed here. By the linewidth limitation of incoherent optical sources, the number of coded grating chips is also limited. Since the spectral linewidth of broadband optical sources is limited, the linewidth has to be partitioned more thinly to support more users in the system. In other words, narrower pulses have to be employed to support the long length of M-sequence codes.

Assuming the fiber grating is of L=1.0 cm in length, the invention can obtain a spectral chip width of $\Delta\lambda_0 \cong 0.42$ nm for a nearly 100% reflectivity. The linewidth for incoherent LED or Er-ASE sources is approximately 53 nm, so we can get about 127 (=53/0.42) gratings for spectral chips coding. With M-sequences of code length 127 as signature addresses, approximately 127 simultaneous users can be provided for the proposed fiber-optic CDMA network. Practical number will be slightly smaller if a guard band is taken into consideration.

The spectral encoder/decoders consist of sets of FBGs work as time domain spreaders as well as selective wavelength slicers. The time domain spread is not obvious for low data rate, but the round-trip transit time through the cascaded fiber gratings needs to be considered. Typically, the length of a fiber Bragg grating is about L=1.0 cm, and the light speed in the fiber core is estimated to be v=c/n=2.055×10$^8$ m/sec (the refractivity of the fiber core is n=1.46). Suppose there are 7 users on line (N=7 gratings cascaded), the maximum round-trip transit time is derived to be $T_b$=2NL/v=0.68 ns. In other words, the data rate can be up to about $R_b$=1/$T_b$=1.5 Gb/s for 7 simultaneous users. If the simultaneous users is increased to N=127, then the maximum round-trip transit time will be $T_b$=2NL/v=12.36 ns. In such case, the data rate can be up to about $R_b$=1/$T_b$=80 Mb/s for 127 simultaneous users. We believe that these figures are good enough to provide for today's optical networking requirement.

Characteristics and Efficiencies

The invention aims at the successful applications of fiber Bragg gratings (FBGs) and maximal-length sequence codes (M-sequence codes) in the encoder and decoder devices of fiber-optic CDMA network system. On utilizing the fine filtering characteristics of FBGs, narrowband spectral chips of specific wavelengths can be produced to match the correlation characteristics of the built-in M-sequence codes in the gratings. Quasi-orthogonal correlations of M-sequence codes can suitably eliminate the multiple-access interference caused by other system users. The elimination of multiple-access interferences will greatly enhance the performance of the fiber-optic CDMA network.

Though ultrashort pulse CDMA can in principle yield a substantial throughput advantage over the incoherent broadband systems, incoherent threshold energy detection is more reliable than coherent grating pulse alignment. Moreover, the coherent OCDMA scheme needs femto-second ultrashort pulse technology and this is still a great challenge at the present time. The incoherent optical CDMA scheme combines the on-off keying modulation of broadband optical sources and the build-in pseudo-orthogonal characteristics of M-sequence codes. In such scheme, the invention can eliminate multiple-access interference. The structure of the fiber-optic CDMA encoder/decoder is simple and the system performance is reliable.

The optical encoder/decoder devices comprises a series of fiber Bragg gratings. The proposed FO-CDMA network can suitably eliminate the effects of multiple-access interferences. This not only reduces the error transmission rate but also promotes the whole system performance. On reviewing the issued patents and research reports around the world, we cannot find the same kind of OCDMA encoder/decoder devices with fiber grating scheme. The adopted incoherent LED and Er-ASE sources offer broadband spectrum, high emitting power, low temperature sensitivity, and small drive current requirement. The architecture of fiber grating encoder/decoders is quite simple and the system cost can be relatively low.

The fiber-optic CDMA encoder/decoder modules can be applied in the switching routers of local computer networks. They can work as signal exchange unit of information networks between different data nodes. The data nodes include the intelligent appliances of home security, cellular phone, personal computers, high-definition televisions, and computerized refrigerators, etc. Following the popularity of personal computer and intelligent appliances, the invention can be applied in ADSL (Asymmetric Digital Subscriber Loop) or Cable Modem to connect digital home network.

The invention can be applied on ITG (Internet Telephony Gateway) network. Through with telephone and FAX services, an extension can link to local-area network to turn into a network phone. The invention can also be applied on FITL (fiber in the loop) between toll station and subscribers to provide for broadband services of fiber-to-the-home (FTTH). Current switching devices are mainly TDM (Time-Division Multiplexing), FDM (frequency-Division Multiplexing) or WDM (Wavelength-Division Multiplexing) schemes with limited network nodes connected. The invention of FO-CDMA encoder/decoders can provide for 7 channels to access the network at 1.5 Gbps data rate or 127 channels to access with 80 Mbps data rate. These figures are good enough for today's optical networking requirement.

What is claimed is:

1. A system that includes an optical receiver decoder module for a FO-CDMA network, the module comprising:
   a matched set of cascaded fiber decoder gratings for spectral decoding the received accumulated spectral chips by way of gratings disposed to reflect a set of narrowband spectral chips at designated Bragg wavelengths and to transmit a complementary set of spectral chips not at designated Bragg wavelengths directly through the decoder gratings;

an optical circulator for circulating the accumulated spectral chips into the matched set of cascaded fiber decoder gratings, and the reflected optical signals to a de-correlated output branch;

a balanced photo-detector unit that includes a pair of identical photodiodes that subtracts the transmitted complementary chips signal from the reflected chips signal; and an information data decision unit to read the net signal energy coming from the balanced photo-detector to determine a received information data bit.

2. The system of claim 1, wherein the fiber decoder gratings are configured on the basis of orthogonal M-sequence codes such that a correlation subtraction is implemented on the two identical photodiodes of the balanced photo-detector to eliminate the possible multiple-access interference caused by other system users in the FO-CDMA network.

3. The system of claim 1, further including an optical transmitter encoder module for the FO-CDMA network, the encoder module comprising:

an incoherent optical source as optical carrier of external E/O modulated information data, wherein the source is one of the following: Edge-emitting LED's (ELEDs), Superluminescent Diodes (SLDs), and Erbium-Amplified Spontaneous Emissions (Er-ASEs);

an external intensity modulator for "On-Off Keying" the optical intensity of the incoherent light source with information data bits at the transmitter end;

an optical circulator for circulating the modulated optical source signals into fiber encoder gratings and the reflected spectral chips to the encoded output branch; and a set of cascaded fiber encoder gratings disposed to reflect sequences of narrowband spectral chips at the designated Bragg wavelengths.

4. The system of claim 3, wherein the transmitter encoder module is one of K spectrally pseudo-orthogonal coded fiber grating encoders;

the receiver decoder module is one of K spectrally pseudo-orthogonal coded fiber grating decoders;

the K transmitter encoder modules and K receiver decoder modules are connected to each other with a K×K optical fiber star coupler;

the spectrum-encoded signals of transmitter encoder modules are put together in the optical star coupler and broadcast to all receiver decoder modules in the network; and the information data bits are recovered using matched signature address codes between encoder and decoder gratings.

5. The system of claim 4, wherein the fiber gratings are 0.8 cm to 2.0 cm in length and the LED or Er-ASE source is of 45 nm to 53 nm in linewidth so that either 7 different grating wavelengths can be designed to operate at a data rate of 1.5 Gb/s or around 127 different grating wavelengths be designed to operate at a data rate of 80 Mb/s and hence approximately 10.5 Gbps.user capacities can be provided for the claimed fiber-optic CDMA network.

6. A FO-CDMA network that includes an optical transmitter encoder module comprising:

an incoherent optical source as optical carrier of external E/O modulated information data, wherein the source is one of the following: Edge-emitting LED's (ELEDs), Superluminescent Diodes (SLDs), and Erbium-Amplified Spontaneous Emissions (Er-ASEs);

an external intensity modulator for "On-Off Keying" the optical intensity of the incoherent light source with information data bits at the transmitter end;

an optical circulator for circulating the modulated optical source signals into fiber encoder gratings and the reflected spectral chips to the encoded output branch; and a set of cascaded fiber encoder gratings disposed to reflect sequences of narrowband spectral chips at designated Bragg wavelengths.

7. The network of claim 6, wherein the transmitter encoder module includes a spectrally pseudo-orthogonal coded fiber encoder grating device having a series of fiber Bragg gratings to work as time domain spreaders as well as selective wavelength slicers;

the cascaded fiber Bragg gratings are designed with a spectral chips pattern corresponding to the chips distribution of a nearly orthogonal M-sequence codes;

the reflected chip wavelength is determined by the grating pitch and the refractive index variation of the fiber Bragg gratings;

the incoming broadband optical signal having spectral components equal to the designed Bragg wavelengths of the fiber gratings will cause the spectral chip components to be reflected, and will cause the spectral chip components not on the Bragg wavelengths to be transmitted.

8. The network of claim 7, further including: an optical receiver decoder module comprising:

a matched set of cascaded fiber decoder gratings for spectral decoding the received accumulated spectral chips by way of gratings disposed to reflect narrowband spectral chips at the designated Bragg wavelengths and to transmit complementary spectral chips not at the designated Bragg wavelengths directly through the decoder gratings;

an optical circulator for circulating the accumulated spectral chips into the matched set of cascaded fiber decoder gratings, and the reflected optical signals to a de-correlated output branch;

a balanced photo-detector unit that includes a pair of identical photodiodes that subtracts a transmitted complementary chips signal from the reflected chips signal; and an information data decision unit to read the net signal energy coming from the balanced photo-detector to determine a received information data bit.

9. The network of claim 8, wherein the receiver decoder module includes a spectrally pseudo-orthogonal coded fiber decoder grating device having a series of fiber Bragg gratings;

the cascaded fiber decoder gratings are designed with a spectral chips pattern corresponding to the chips distribution of the nearly orthogonal M-sequence codes;

the decoder gratings characterize the same spectrum response as that of the encoder gratings, but with a reversed grating order to accomplish the same optical path for every component spectral chip;

the reflected and transmitted light fields from the Bragg decoder grating devices complement each other and provide for information correlation decoding.

10. The network of claim 9, wherein the N code vectors from different cyclic shifts of any M-sequence codeword of code length N are taken as signature address codes to provide for N pairs of matched fiber encoder and decoder gratings; and the quasi-orthogonal M-sequence coding arrangement greatly reduces multiple-access interference from other simultaneous users and enhances the user capacity of the FO-CDMA network system.

11. The network of claim 9, wherein the network employs a tunable fiber grating encoder/decoder scheme controlled with piezoelectric transducer (PZT) devices wherein each of the receiver decoder gratings can tune on a particular incoming signal by adjusting its address code to match the corresponding transmitter encoder gratings; and the Bragg wavelength of each fiber-grating decoder is adjusted independently, effectively changing the signature spectral pattern and allowing for programmable address codes for point-to-point communication and point-to-multipoint networks.

* * * * *